US012673775B2

(12) United States Patent
Princip et al.

(10) Patent No.: US 12,673,775 B2
(45) Date of Patent: Jul. 7, 2026

(54) SEAT CONSOLE WITH ERGONOMICALLY POSITIONED CABLE-ACTUATED PASSENGER CONTROL UNIT

(71) Applicant: B/E Aerospace, Inc., Winston-Salem, NC (US)

(72) Inventors: Michael M. Princip, Winston-Salem, NC (US); Alexander L. Velet, Clemmons, NC (US); Charles Martin Hansson, Winston-Salem, NC (US); Travis J. Vaninetti, Bothell, WA (US); Brian D. Green, King, NC (US); Karen J. Nanney, Winston-Salem, NC (US); Joshua Wilson, Charlotte, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 520 days.

(21) Appl. No.: 18/204,648

(22) Filed: Jun. 1, 2023

(65) Prior Publication Data

US 2024/0400206 A1 Dec. 5, 2024

(51) Int. Cl.
*B64D 11/06* (2006.01)

(52) U.S. Cl.
CPC ...... *B64D 11/0646* (2014.12); *B64D 11/0638* (2014.12); *B64D 11/064* (2014.12)

(58) Field of Classification Search
CPC .. B60N 2/75; B60N 2/78; B60N 2/797; B60R 2011/0007; B60R 7/04; B64D 11/0646; B64D 11/0638; B64D 11/00155
USPC .............................................. 296/1.09, 24.34
See application file for complete search history.

(56) References Cited

U.S. PATENT DOCUMENTS

| | | | |
|---|---|---|---|
| 4,916,269 A | 4/1990 | Spazierer et al. | |
| 9,539,458 B1 * | 1/2017 | Ross | A63B 21/4043 |
| 9,656,583 B2 * | 5/2017 | Gaither | B64D 11/0641 |
| 9,828,099 B2 * | 11/2017 | Henshaw | B64D 11/0605 |
| 9,981,571 B2 * | 5/2018 | Garing | B60N 2/797 |
| 10,173,778 B2 * | 1/2019 | Senneff | H02B 1/048 |
| 10,279,917 B1 * | 5/2019 | Wilkey | B60N 2/231 |
| 10,457,170 B2 * | 10/2019 | Line | B60N 3/004 |
| 10,494,101 B2 * | 12/2019 | Wilson | B64D 11/0642 |

(Continued)

FOREIGN PATENT DOCUMENTS

| | | |
|---|---|---|
| DE | 3719105 A1 | 12/1988 |
| DE | 202016101747 U1 | 4/2016 |

(Continued)

OTHER PUBLICATIONS

European Patent Office, Extended European Search Report received in EP Application No. 24179668.9, Oct. 15, 2024, 10 pages.

*Primary Examiner* — Jason S Morrow
(74) *Attorney, Agent, or Firm* — Suiter Swantz IP

(57) ABSTRACT

A seat console including an upper console portion defining an interior space, a lower console portion positioned below the upper console portion, and at least one cable-actuated passenger control unit (PCU) positioned in the interior space in the upper console portion, the cable-actuated PCU including at least one pushbutton subassembly including a pushbutton presented through one of a first lateral side and a second lateral side of the upper console portion. The seat console may be implemented as a single seat console, or a center console configured to be positioned between two seats.

11 Claims, 7 Drawing Sheets

(56)     References Cited

U.S. PATENT DOCUMENTS

| | | | | |
|---|---|---|---|---|
| 10,604,048 | B2 | 3/2020 | Vela et al. | |
| 11,820,516 | B2 * | 11/2023 | Hontz | B64D 11/0638 |
| 11,827,361 | B2 * | 11/2023 | Warren | B60N 2/062 |
| 11,904,748 | B2 * | 2/2024 | Li | B60N 2/767 |
| 11,970,271 | B2 * | 4/2024 | Dowty | H01H 13/14 |
| 2006/0186715 | A1 | 8/2006 | Schweizer | |
| 2007/0085389 | A1 * | 4/2007 | Schurg | B64D 11/06 |
| | | | | 297/184.1 |
| 2010/0032999 | A1 | 2/2010 | Petitpierre | |
| 2011/0227359 | A1 * | 9/2011 | Fesenmyer | B60N 3/101 |
| | | | | 296/1.09 |
| 2018/0312084 | A1 * | 11/2018 | Does | B64D 11/064 |
| 2020/0108936 | A1 * | 4/2020 | Erb | B64D 11/06395 |
| 2022/0194595 | A1 * | 6/2022 | Pevida | B60N 2/2209 |
| 2023/0136911 | A1 | 5/2023 | Nukui | |
| 2024/0101034 | A1 * | 3/2024 | Stephan | B60R 7/04 |
| 2024/0278692 | A1 * | 8/2024 | Svitak | B60N 2/0244 |
| 2024/0400206 | A1 * | 12/2024 | Princip | B64D 11/0638 |
| 2024/0409218 | A1 * | 12/2024 | Princip | B60N 3/002 |

FOREIGN PATENT DOCUMENTS

| | | | | |
|---|---|---|---|---|
| FR | 2889125 | A3 | 2/2007 | |
| JP | H04127040 | U * | 11/1992 | |
| KR | 101515564 | B1 | 4/2015 | |
| WO | WO-2021070286 | A1 * | 4/2021 | B60N 2/793 |

* cited by examiner

SEAT CONSOLE WITH ERGONOMICALLY POSITIONED CABLE-ACTUATED PASSENGER CONTROL UNIT

TECHNICAL FIELD AND BACKGROUND

The present disclosure relates generally to solutions for locating passenger seat controls, and more particularly, to a seat console including at least one cable-actuated passenger control unit (PCU) positioned at armrest level for high visibility and ergonomic operation.

Many airlines offer business and first-class seats equipped with electronic passenger controls units (PCUs). Electronic PCUs may include electronic buttons, wherein each button is associated with a different seat component to adjust the seat component to achieve different sitting positions such as upright for taxi, takeoff, and landing (TTOL), lounge for in-flight comfort, and lie-flat for sleeping. Electronic PCUs, due to the compact nature of electronic components such as electronic buttons, printed circuit boards, and electrical wiring, allow electronic PCUs to be positioned quite effectively in various highly visible and ergonomic locations.

In some cases, passengers may prefer the feel of a mechanically actuated PCU; however, locating mechanical components in highly visible and ergonomic configurations presents a challenge considering the larger component sizes and spaces needed to accommodate moving parts, couplings, linkages, and associated cabling.

Therefore, what is needed is a compact configuration for a cable-actuated PCU that allows for positioning in a highly visible and ergonomic location, as well as a cable-actuated PCU designed for easy maintenance, cleaning, customization, and interchangeability.

BRIEF SUMMARY

In one aspect, embodiments of the inventive concepts disclosed herein are directed to a seat console. In embodiments, the seat console includes an upper console portion having a top, a front, a back, a first lateral side, a second lateral side, and defining an interior space, a lower console portion positioned below the upper console portion, and a cable-actuated passenger control unit (PCU) positioned in the interior space in the upper console portion, the cable-actuated PCU including at least one pushbutton subassembly including a pushbutton presented through one of the first lateral side and the second lateral side of the upper console portion.

In some embodiments, the at least one pushbutton subassembly further includes a spring-loaded pin attached to the pushbutton, a spring-loaded rocker rotatably mounted in the interior space, and a cable routed through the lower console portion and coupled at one end to the spring-loaded rocker. In use, pressing the pushbutton causes the spring-loaded pin to rotate the spring-loaded rocker thereby pulling the cable, and when the pushbutton is released, spring forces return the spring-loaded rocker and the pushbutton to their respective original positions ready for the next pressing.

In some embodiments, motion of the spring-loaded pin is linear, substantially horizontal, and substantially perpendicular to an orientation of the cable entering the upper console portion from the lower console portion.

In some embodiments, the pushbutton includes indicia illustrating a predetermined seat function.

In some embodiments, each of the first lateral side and the second lateral side includes a vertical portion and an inclined portion positioned above the vertical portion, wherein the pushbutton is presented through the vertical portion and indicia illustrating a predetermined seat function is positioned on the inclined portion directly above the pushbutton.

In some embodiments, the width of the upper console portion is greater than the thickness of the upper console portion, and the height of the lower console portion is greater than the width of the lower console portion.

In some embodiments, the upper console portion includes a cocktail tray configured to be deployed through the front of the upper console portion.

In some embodiments, the upper console portion includes a tabletop positioned on the top of the console and a padded armrest extending from the back of the upper console portion to the tabletop.

In some embodiments, the upper console portion is 3 inches to 10 inches wide, and the upper console portion is no more than 3 inches thick.

According to another aspect, embodiments of the inventive concepts disclosed herein are directed to a center console configured to be positioned between two passenger seats. In embodiments, the center console includes an upper console portion having a top, a front, a back, a first lateral side, a second lateral side, and defining an interior space, and a lower console portion positioned below the upper console portion. The center console further includes a first cable-actuated passenger control unit (PCU) positioned in the interior space in the upper console portion, the first cable-actuated PCU including at least one pushbutton subassembly including a pushbutton presented through the first lateral side of the upper console portion, and a second cable-actuated PCU positioned in the interior space in the upper console portion, the second cable-actuated PCU comprising at least one pushbutton subassembly including a pushbutton presented through the second lateral side of the upper console portion.

In some embodiments, the center console includes a cocktail tray configured to be deployed through the front of the upper console portion.

In some embodiments, the center console includes a tabletop positioned on the top of the upper console portion, and a first armrest and a second armrest extending from the back of the upper console portion to the tabletop.

In some embodiments, the center console further includes an upwardly extending privacy divider positioned between the first armrest and the second armrest.

In some embodiments, the upper console portion laterally overhangs the lower console portion, and the lower console portion includes a first cupholder and a second cupholder.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
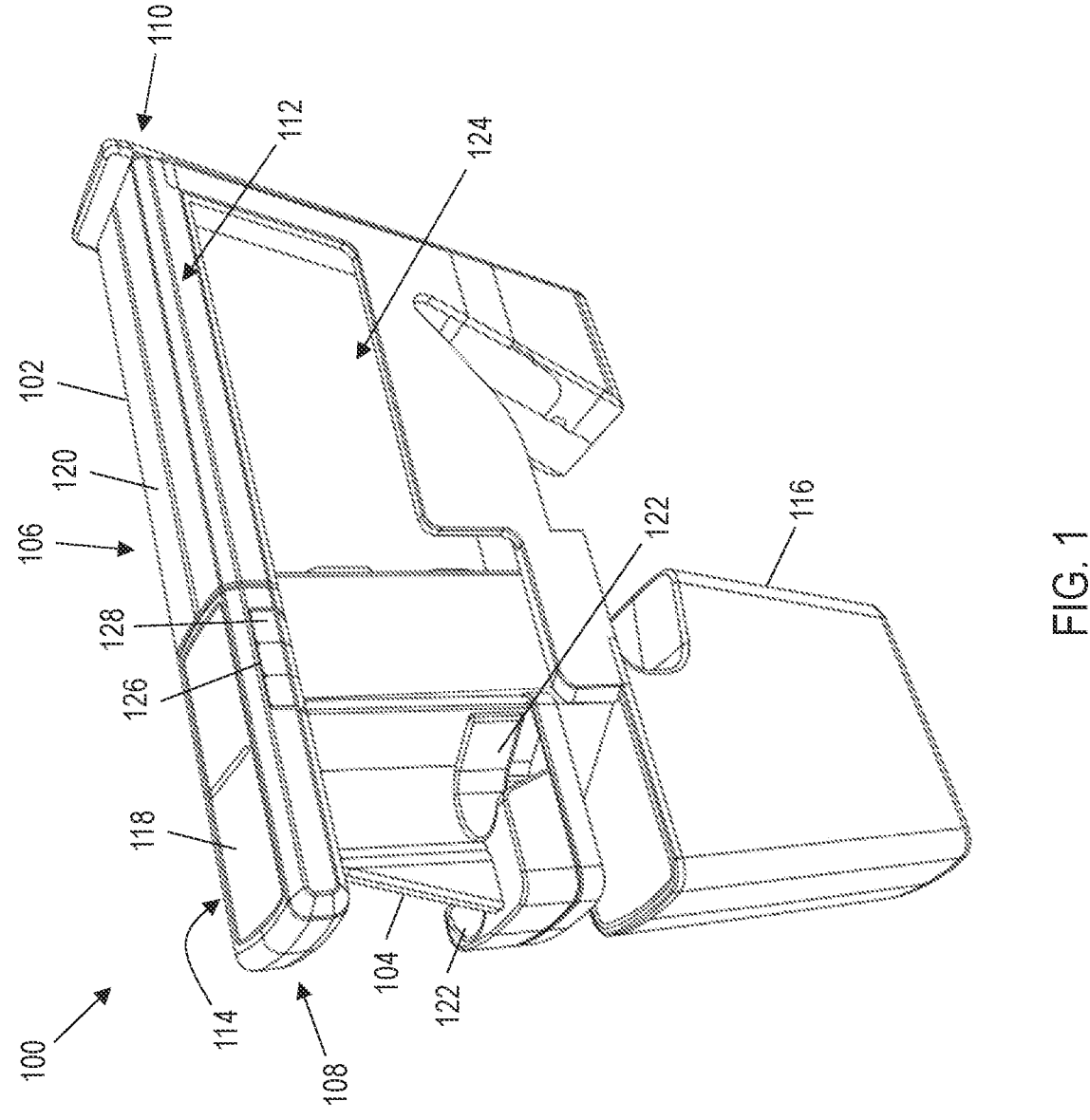
FIG. 1 is a front and lateral side perspective view of a seat console, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to seat consoles. In some implementations, the seat console may be a single seat console or may be a center console configured to be positioned between two passenger seats, for instance two business or first-class aircraft passenger seats. The passenger seat(s) include adjustable components or other seat functions. For example, the seat(s) may include adjustable seat components such as a reclining backrest, a rotating leg rest, a tilting seat pan, etc. The seat console serves as a highly visible and ergonomic location for positioning control assemblies for performing predetermined seat functions.

In embodiments, seat functions are performed using cable-actuated passenger control units (PCU) positioned in the seat console at armrest level. At armrest level, a seated passenger is able to operate the cable-actuated PCU with their thumb while their arm remains rested on the armrest. The cable-actuated PCU includes mechanical pushbuttons, wherein each pushbutton controls a different predetermined seat function. As discussed in detail below, each pushbutton is part of a larger pushbutton subassembly further including at least a rocker and cabling. In use, pushing a pushbutton causes the pushbutton to interact with the rocker. One end of the cable is attached to the rocker while the opposing end of the cable is attached to an element controlling a seat function, for instance a locking gas spring, actuator, etc. Pulling the cable actuates the element thereby causing or otherwise allowing the seat function to be achieved. Each of the pushbutton and the rocker may be spring loaded, such that when the passenger releases the pushbutton, the pushbutton and rocker return to their original positions ready for the next pushbutton pressing.

Benefits and advantages of the seat console embodiments described herein include a cost-effective mechanical PCU solution for seat performing seat functions, compact packing which frees console interior space for other uses, superior feel as compared to electrical PCUs, ergonomic accessibility, as well as easy maintenance, cleaning, customization, and interchangeability.

FIG. 1 illustrates a seat console 100 according to one embodiment. The seat console 100 may be used with a single passenger seat or implemented as a center console serving two passenger seats positioned on opposite sides of the seat console 100. The seat console 100, also referred to herein as "the console," generally includes an upper console portion 102 and lower console portion 104. The longitudinal axis of the upper console portion 102 is oriented substantially horizontal, while the longitudinal axis of the lower console portion 104 is oriented substantially vertical. In some embodiments, the lower console portion 104 supports the upper console portion 102 from below. In some embodiments, at least portions of the upper console portion 102 and the lower console portion 104 may be integrally formed. Portions of the upper and lower console portions 102, 104 may be made from, for example, plastic due to its durability, light weight, ability to be colored, cleanability, etc.

The upper console portion 102 has a top 106, a front 108, a back 110, a first (e.g., left) lateral side 112, and a second (e.g., right) lateral side 114. The console 100 may include additional console portions, for instance a base 116 configured to be attached to the floor. The top 106 of the upper console portion 102 forms a substantially flat horizontal surface including a tabletop 118 and at least one armrest 120. The tabletop 118 may open to provide access to internal compartments formed in the interior space within the upper console portion 102. The armrest 120 may be divided into two laterally-adjacent armrests used by two passengers in the case of a center console. The armrest(s) may also pivot open to provide access to an internal compartment. In some embodiments, the lower console portion 104 may include at least one cupholder 122 and at least one literature pocket 124.

A cable-actuated PCU 126 is positioned in the interior space formed in the upper console portion 102. Mechanical pushbuttons 128 of the cable-actuated PCU 126 are presented through one of the first and second lateral sides 112, 114 of the upper console portion 102. In this position, a passenger resting his/her arm on the armrest 120 is able to operate the pushbuttons 128 with their thumb for comfort and convenience. In the case of a center console, two cable-actuated PCUs 126 may be positioned in the interior space formed in the upper console portion 102 with the pushbuttons 128 of the first cable-actuated PCU 126 presented through the first lateral side 112, and the pushbuttons 128 of the second cable-actuated PCU 126 presented through the second lateral side 114. In some embodiments, the upper console portion 102 may be symmetrical about a vertical line of symmetry.

Figure 2:
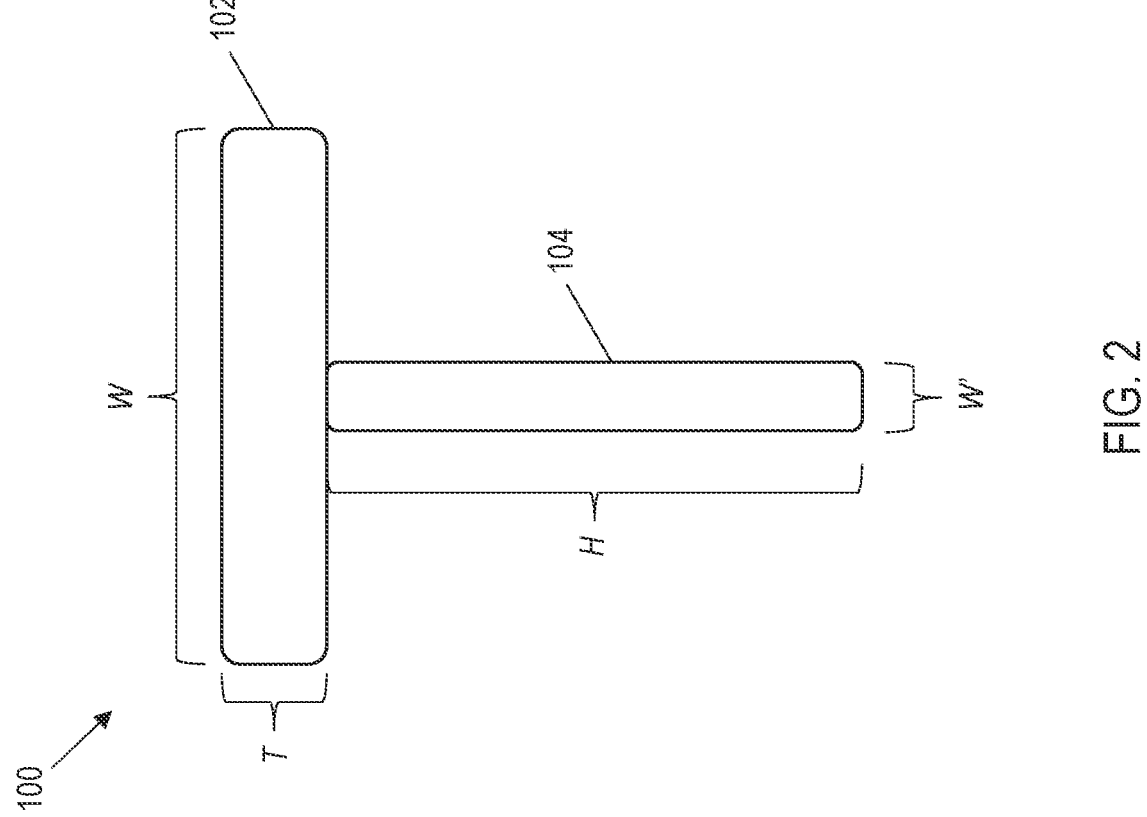
FIG. 2 is a schematic front elevation view of the seat console, in accordance with example embodiments of this disclosure.

FIG. 2 is a schematic front view of the console 100 illustrating portion dimensions and dimensional comparisons. In embodiments, the width W of the upper console portion 102 is greater than the thickness T of the upper console portion, and the height H of the lower console portion 104 is greater than the width W' of the lower console portion 104. In some embodiments, the thickness T of the upper console portion 102 is greater than the width W' of the lower console portion 104. In a particular embodiment, the upper console portion 102 is from about 3 inches wide up to about 10 inches wide, for example, about 4 inches wide in the case of a single seat console, about 5 inches wide in the case of a narrowbody aircraft center console, and about 8 inches wide in the case of a widebody center console. In some embodiments, the upper console portion 102 is no more than 5 inches thick, and more preferably no more than 3 inches thick.

Figure 3:
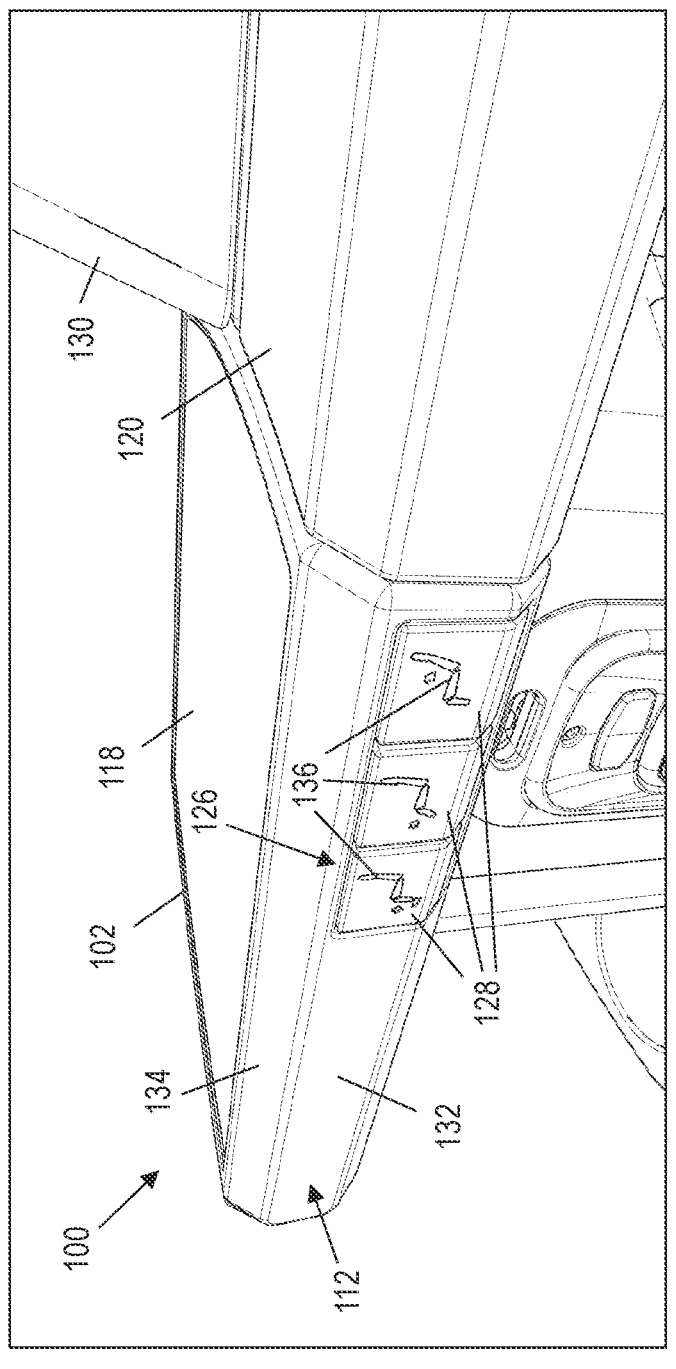
FIG. 3 is a top and later side perspective view of the upper console portion illustrating pushbuttons for seat component adjustability, in accordance with example embodiments of this disclosure.

FIG. 3 illustrates a center console 100 configuration in which the upper console portion 102 includes the tabletop 118, armrests 120, and an upwardly extending privacy divider 130 mounted to the top of the console between the left and right armrests. As shown, the first lateral side 112 includes a first substantially vertical surface 132 and a second inclined surface 134 angled to face a seated passenger looking down at the console 100. The pushbuttons 128 are presented through the substantially vertical surface 132. While three pushbuttons 128 are shown, the cable-actuated PCU 126 may include 1, 2, 3 . . . n number of pushbuttons 128 depending on the performance capabilities of the seat.

Each pushbutton 128 carries indicia 136 schematically illustrating the predetermined function associated with that particular pushbutton 128. As shown, for example, the left pushbutton 128 indicates foot adjustment, the middle pushbutton 128 indicates leg rest adjustment, and the right pushbutton 128 indicates backrest adjustment. Indicia may be in the form of graphics, text, printing, labels, illumination, etc., conveying the predetermined function to the passenger.

Figure 4:
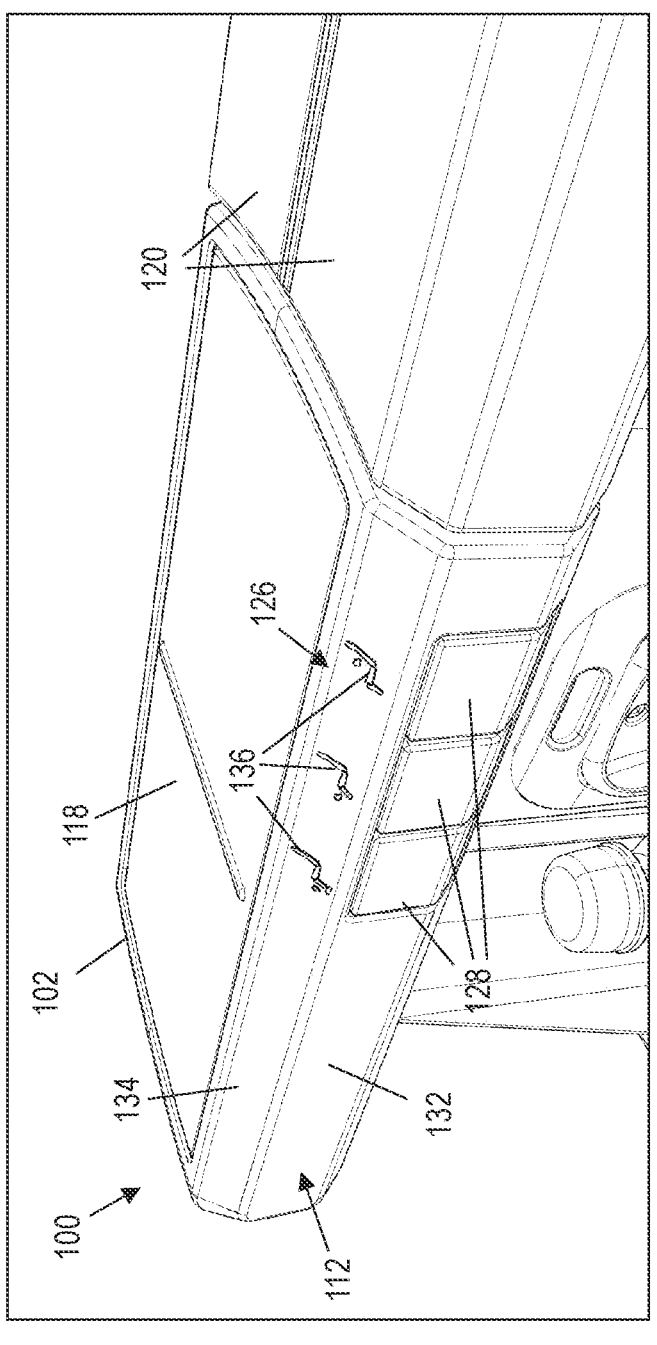
FIG. 4 is a top and lateral side perspective view of the upper console portion illustrating indicia for seat component adjustability position separate from the pushbuttons, in accordance with example embodiments of this disclosure.

FIG. 4 illustrates a different center console 100 configuration in which the upper console portion 102 includes the tabletop 118 and two armrests 120. As shown, the first lateral side 112 includes also includes a first substantially vertical surface 132 and a second inclined surface 134 angled to face a seated passenger looking down at the console 100. The pushbuttons 128 of the cable-actuated PCU 126 are presented through the substantially vertical surface 132. While three pushbuttons 128 are shown, the cable-actuated PCU may include 1, 2, 3 . . . n number of pushbuttons 128 depending on the adjustment capabilities of the seat. In this configuration, the indicia 136 associated with each pushbutton 128 is positioned on the inclined surface 134 directly above their respective pushbutton 128. In this configuration, the indicia 136 may be more visible to the passenger looking down on the console 100, while the pushbuttons 128 can still be pressed with the thumb.

Figure 5:
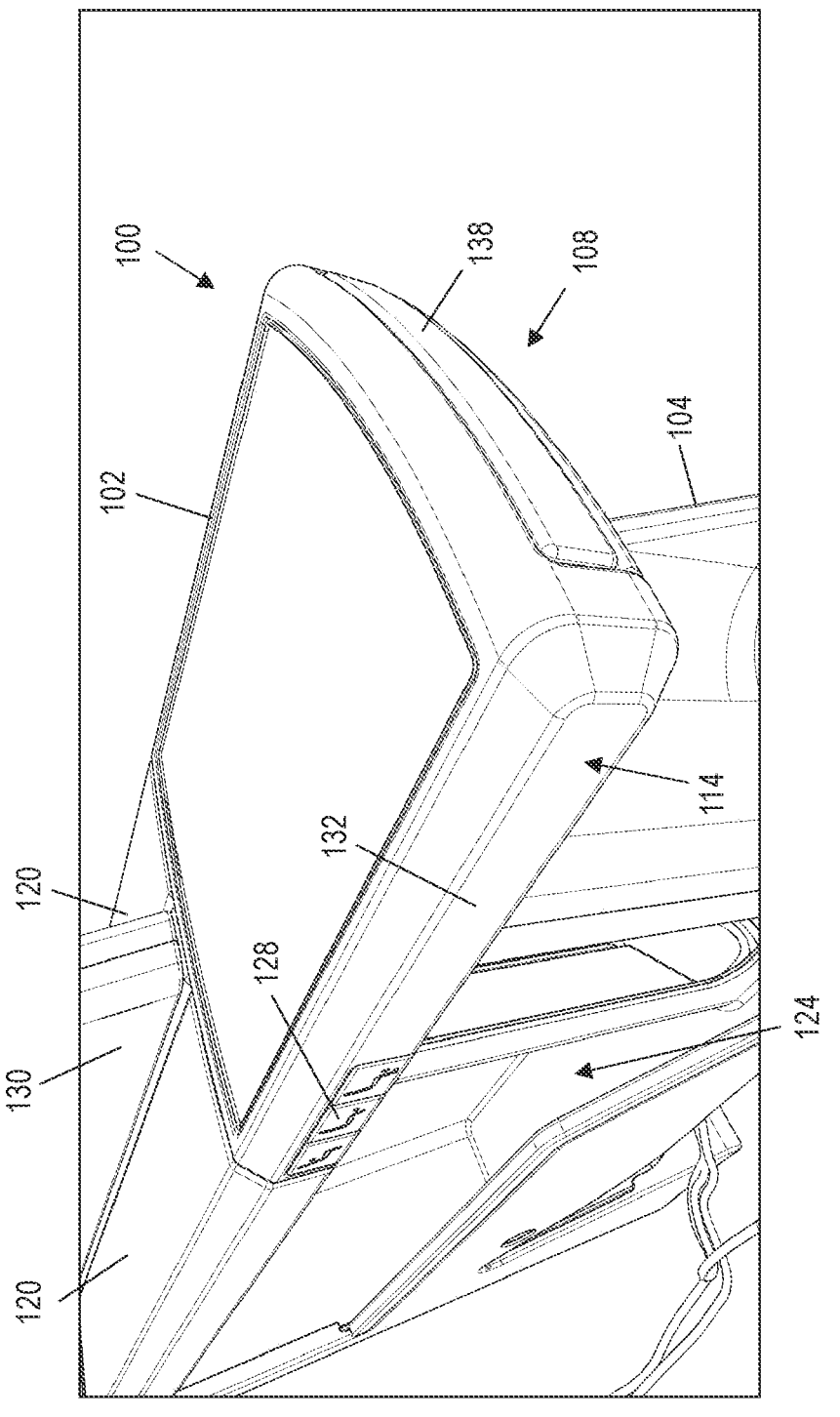
FIG. 5 is a front and top perspective view of the upper console portion illustrating a tabletop and deployable cocktail tray, in accordance with example embodiments of this disclosure.

FIG. 5 illustrates a console 100 including an optional cocktail table 138 deployable through an opening formed in the front 108 of the upper console portion 102. In embodiments, the cocktail table 138 may be spring-loaded and pushed to activate deployment via a spring force and pushed back into the upper console portion 102 to stow the cocktail table 138 and load the spring for the next deployment. The console 100 as shown further includes the split armrest 120 configuration with upstanding privacy divider 130, and pushbuttons 128 presented on the vertical surface 132 of the right lateral side 114. As shown, the upper console portion 104 laterally overhangs the lower console portion 104 such that the literature pockets 124 can be positioned in the lower console portion 104 below the overhanging upper console portion 102.

Figure 6:
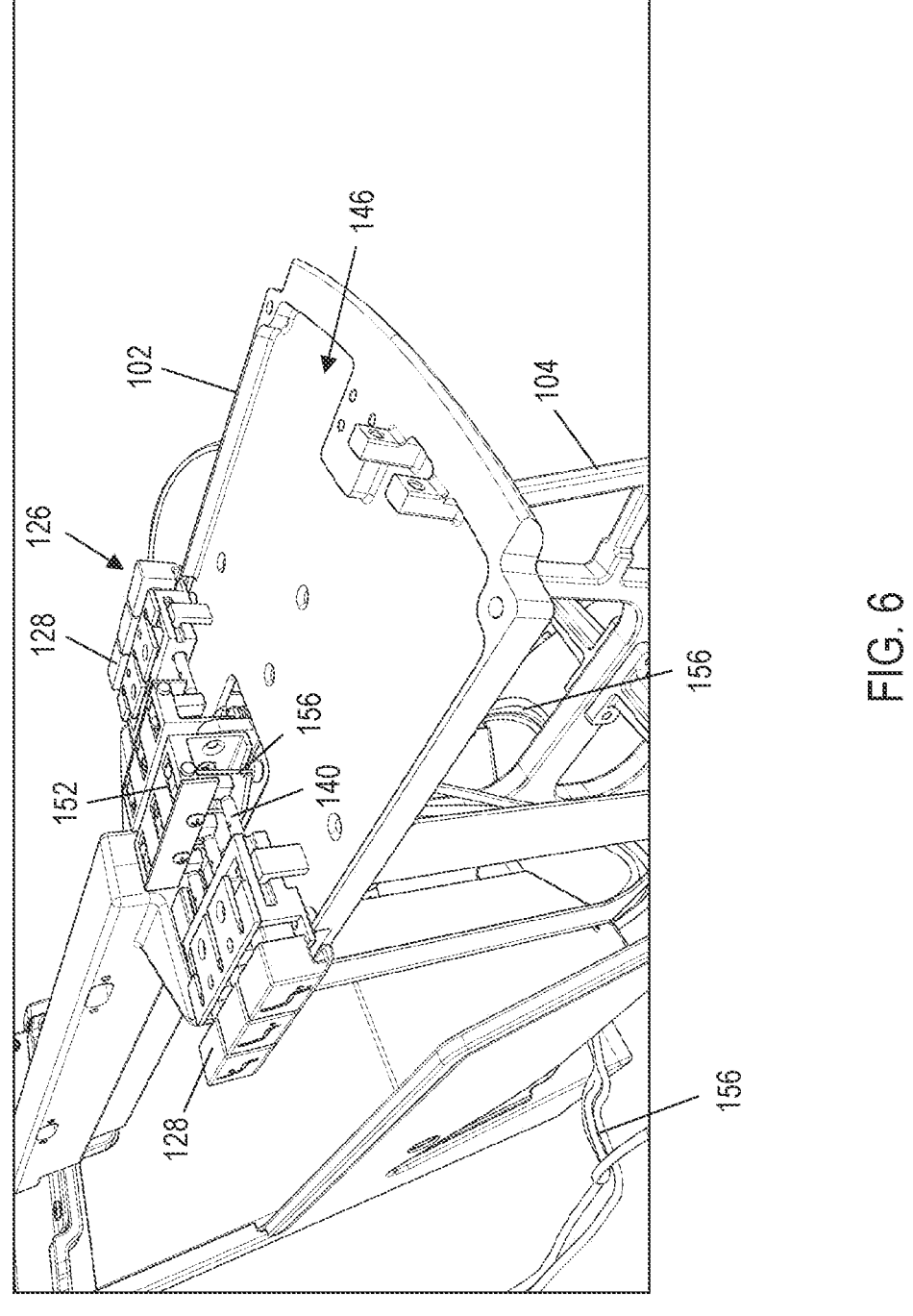
FIG. 6 is a front and top perspective view of the upper console portion shown with the top removed to illustrate the pushbutton subassemblies.
Figure 7:
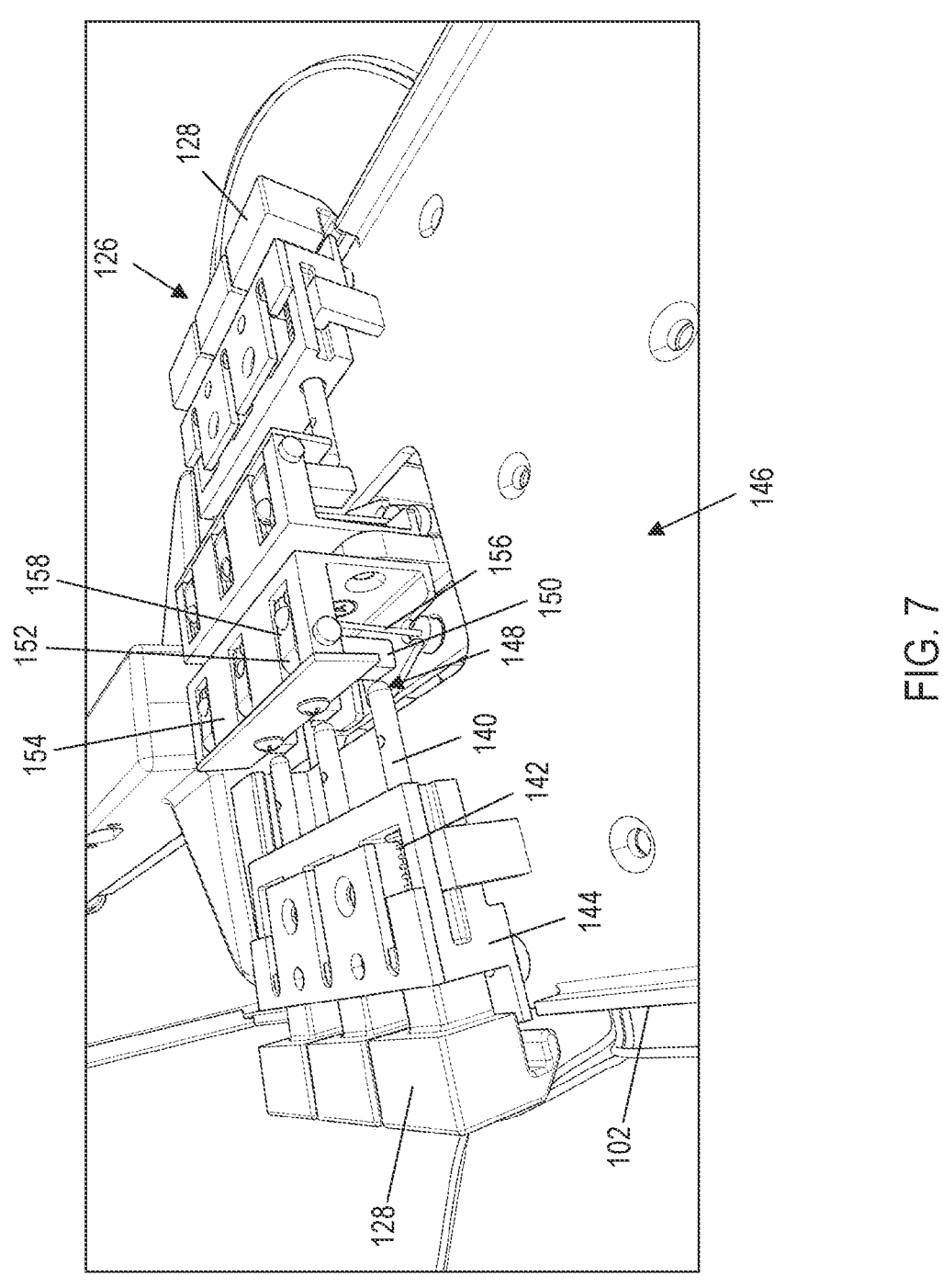
FIG. 7 is an enlarged perspective view of the pushbutton subassemblies.

FIGS. 6 and 7 illustrate components and workings of the cable-actuate PCUs 126 for performing seat component adjustments. Each cable-actuated PCU 126 as shown includes multiple pushbutton assemblies, with each subassembly including a pushbutton 128 assigned to a particular seat adjustment or function as discussed above. Each pushbutton 128 carries or is coupled to a spring-loaded pin 140. A compression spring 142 axially surrounding the pin 140 is disposed between one end of the pushbutton 128 and a wall of a bracket 144 to which the pushbutton 128 is mounted for linear motion, for example, in a substantially horizontal direction. In use, pressing the pushbutton 128 toward the interior space 146 within the upper console portion 102 causes the compression spring 142 to compress thereby energizing the compression spring 142. When the pushbutton 128 is released, the stored spring force returns the pushbutton 128 to its original position ready for the next pressing.

A rounded end 148 of the pin 140, positioned opposite the pushbutton 128, engages a first leg 150 of a rocker 152 rotatably mounted in the interior space 146. As shown, the rocker 152 is rotatably mounted to another bracket 154 mounted in the interior space 146. One end of a cable 156, for example a Bowden cable in which a wire is configured to translate relative to its jacket, is attached or otherwise coupled to a second leg 158 of the rocker 152 which is angled, for example orthogonal, relative to the first leg 150. In use, linear motion of the pin 140, caused by pressing the pushbutton 128, causes the rocker 152 to rotate thereby lifting the second leg 158 thereby pulling the cable 156. As discussed above, the other end of the cable 156 is coupled to a device configured to cause motion, release to allow motion, or otherwise perform a seat function, for instance component adjustment. In use, releasing the pushbutton 128 moves the pin 140 out of contact with the rocker 152, or at least removes the pressing force while still maintaining contact with the rocker 152, such that a biasing member associated with the rocker 152 returns the rocker 152 to its original position.

The packaging of the cable-actuated PCUs 126 and their respective pushbutton subassemblies is compact such that each cable-actuated PCU 126 has a low-profile, and multiple pushbutton subassemblies can be positioned side-by-side in the interior space 146. In some embodiments, the left and right cable-actuated PCUs 126 may be symmetrical. Each bracket 144, 154 may be used to mount the bank of its respective components on its respective side. In some embodiments, the motion of the pin 140 is substantially horizontal and the orientation of the cable 156 entering the interior space 146 from below is substantially vertical to further enhance compact packaging. As shown, the cable-actuated PCUs are positioned toward the "back" of the interior space 146 such that the "front" of the interior space 146 is available for other uses, for instance a deployable cocktail table. With specific reference to FIG. 6, the plurality of cables 156, for instance organized as a bundle, are routed down through the lower console portion 104 substantially vertical and ultimately exit the lower console portion 104 in the direction of their respective seat.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A center console configured to be positioned between two passenger seats, comprising:
   an upper console portion having a top, a front, a back, a first lateral side, a second lateral side, and defining an interior space;
   a lower console portion positioned below the upper console portion;
   a first cable-actuated passenger control unit (PCU) positioned in the interior space in the upper console portion, the first cable-actuated PCU comprising at least one pushbutton subassembly including a pushbutton presented through the first lateral side of the upper console portion; and
   a second cable-actuated PCU positioned in the interior space in the upper console portion, the second cable-actuated PCU comprising at least one pushbutton subassembly including a pushbutton presented through the second lateral side of the upper console portion.

2. The center console according to claim 1, wherein the at least one pushbutton subassembly of each of the first cable-actuated PCU and the second cable-actuated PCU further comprises:
   a spring-loaded pin attached to the pushbutton;
   a spring-loaded rocker rotatably mounted in the interior space; and
   a cable routed through the lower console portion and coupled at one end to the spring-loaded rocker;
   wherein pressing the pushbutton causes the spring-loaded pin to rotate the spring-loaded rocker thereby pulling the cable; and
   wherein, when the pushbutton is released, spring forces return the spring-loaded rocker and the pushbutton to their respective original positions.

3. The center console according to claim 2, wherein motion of the spring-loaded pin is linear, substantially horizontal, and substantially perpendicular to an orientation of the cable entering the upper console portion from the lower console portion.

4. The center console according to claim 1, wherein the pushbutton comprises indicia illustrating a predetermined seat function.

5. The center console according to claim 1, wherein each of the first lateral side and the second lateral side includes a vertical portion and an inclined portion positioned above the vertical portion, and wherein the respective pushbutton is presented through the vertical portion and indicia illustrating a predetermined seat function is positioned on the inclined portion directly above the pushbutton.

6. The center console according to claim 1, wherein a width of the upper console portion is greater than a thickness of the upper console portion, and wherein a height of the lower console portion is greater than a width of the lower console portion.

7. The center console according to claim 1, further comprising a cocktail tray configured to be deployed through the front of the upper console portion.

8. The center console according to claim 1, further comprising:
   a tabletop positioned on the top of the upper console portion; and
   a first armrest and a second armrest extending from the back of the upper console portion to the tabletop.

9. The center console according to claim 8, further comprising an upwardly extending privacy divider positioned between the first armrest and the second armrest.

10. The center console according to claim 1, wherein the upper console portion is 3 inches to 10 inches wide, and the upper console portion is no more than 3 inches thick.

11. The center console according to claim 1, wherein the upper console portion laterally overhangs the lower console portion, and wherein the lower console portion comprises a first cupholder and a second cupholder.

* * * * *